Dec. 8, 1942. C. D. BONSALL Re. 22,232

REFRIGERATOR CAR

Original Filed April 24, 1939 2 Sheets-Sheet 1

Inventor:
Charles D. Bonsall
Attorney

Dec. 8, 1942. C. D. BONSALL Re. 22,232

REFRIGERATOR CAR

Original Filed April 24, 1939 2 Sheets-Sheet 2

Inventor:
Charles D. Bonsall
Ernest E. Johnson
Attorney

Reissued Dec. 8, 1942 Re. 22,232

UNITED STATES PATENT OFFICE 22,232

REFRIGERATOR CAR

Charles D. Bonsall, Chicago, Ill., assignor to Standard Railway Devices Company, Chicago, Ill., a corporation of Delaware Original No. 2,272,543, dated February 10, 1942, Serial No. 269,696, April 24, 1939. Application for reissue September 7, 1942, Serial No. 457,639

16 Claims. (Cl. 62—17)

This invention relates to refrigerator cars used to transport perishable commodities at a predetermined temperature. The essential features of a refrigerator car are an insulated body to prevent or retard ingress of heat during warm weather and egress of heat during cold weather and a cooling or heating means depending upon the prevailing outside temperature.

This invention applies particularly to cars in which the cooling means, preferably containers for water ice, eutectic ice, brine or dry ice, are suspended immediately below the ceiling of the car. The lading is supported in spaced relation to the floor by a foraminous rack. Flues, preferably associated with the side walls of the car, communicate between the refrigerant compartment and the space under the floor rack to provide a path for the circulation of air. The path is from the refrigerant compartment downwardly through the aforementioned flues, through the space under the floor rack, and upwardly through the lading compartment to the refrigerant compartment.

Refrigerator cars of the above-mentioned type are commonly built with a series of refrigerant containers positioned near each side wall so that air cooled by tanks near one wall flows through the flue associated with that wall. Similarly air cooled by the containers near the opposite wall flows through a flue associated with said opposite wall. I claim as my improvement the provision of tanks extending between the side walls of the car. Air cooled by one tank preferably flows through a flue associated with one wall while air cooled by the adjacent tank preferably flows through a flue associated with the opposite wall. In other words, flues are associated with both side walls of the car and cold air is supplied to either flue by alternate containers. The advantages of the improvement which I have described are as follows:

The refrigerant containers can be secured directly to the refrigerator car walls and used to support the car roof as well as serve as containers, thus eliminating considerable structure from the upper part of the car.

The provision of greater refrigerant capacity due to the elimination of space at the center of the car between tanks. The entire space below the roof is used for refrigerant in my improved construction.

The containers can also be used as a support for the roof insulation because the containers extend continuously between the side walls of the car.

The reduction in the number of hatches through which the refrigerant is loaded reduces cost of refrigerant loading, particularly the cost of removal and replacement of hatch plugs and covers.

The refrigerant, which has a very considerable mass, is moved from near the eaves of the car to adjacent the center, thereby providing a more stable car less likely to "roll" during service movements.

A greater surface is provided for contact of the air with the refrigerant container, thereby providing a more efficient refrigerating system and lower temperature of the air circulated to the lading compartment of the car.

The duct under the refrigerant container in which air is cooled during flow therethrough is longer, thus providing greater velocity and therefore greater air circulation through the lading compartment.

It may be desirable under certain conditions to use semi-foraminous refrigerant containers so that a portion of the melted refrigerant may flow through the flues, thus further cooling the air and also increasing air circulation due to the velocity of the liquid. The longer duct mentioned above increases the velocity of melted refrigerant and therefore the velocity of air circulation.

Other advantages of my improvement will be apparent from the following detailed description by referring to the drawings in which.

Figure 1:
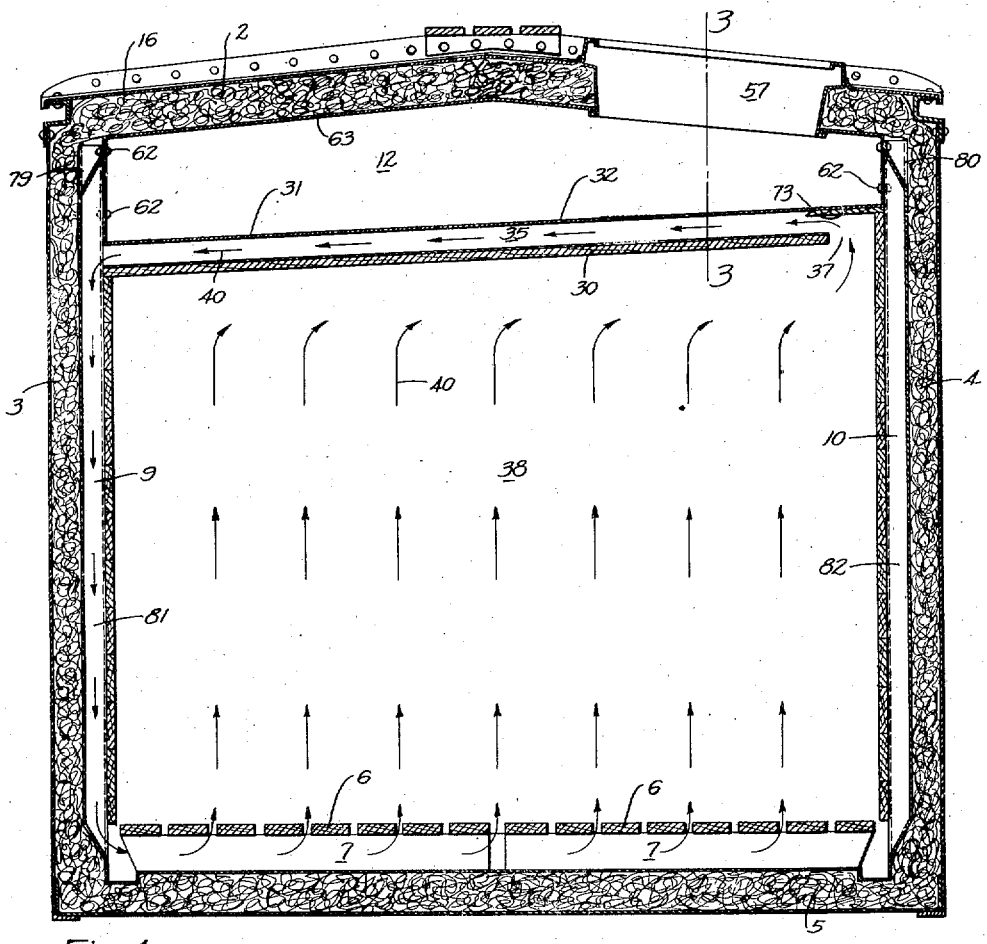
Fig. 1 is a transverse section of a refrigerator car embodying my invention.

Fig. 1 shows a transverse section of a refrigerator car having insulated roof 2, side walls 3, 4 and floor 5. Foraminous racks 6 rest upon the floor to support the lading and provide the space 7 between the lading and the floor 5. Flues 9, 10 are associated with the walls 3, 4 respectively to conduct refrigerated air from the refrigerant chamber to the space 7. The refrigerant chamber 12 is formed by the roof 2, the upper portions of the walls 3, 4 and the drip pans mentioned hereinafter. The refrigerant containers mentioned hereinafter are positioned within the chamber 12 and hatches are provided in the roof 2 and container, above the higher ends of the hereinafter mentioned ducts 35 and 54 for loading refrigerant into said containers and to facilitate spreading the refrigerant, such as water ice or dry ice, over the bottom of the container.

Figure 4:
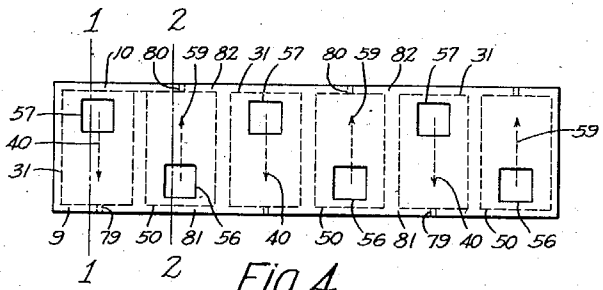
Fig. 4 is a diagrammatic plan view of the car shown in Figs. 1 to 3.

Fig. 1, which is a section on line 1—1 of Fig. 4, shows a drip pan 30 or partition, which forms the bottom of the refrigerenat chamber and top of lading compartment, sloped downwardly toward the flue 9. The container 31 has a bottom 32 whose slope conforms substantially to the slope of the drip pan 30 and is spaced therefrom to provide the duct 35. An air inlet duct 37 is provided for entrance of air from the lading compartment 38 to the duct 35 where it is cooled by contact with the bottom 32 of the container 31 and thence circulates through the flue 9 and space 7 to the lading compartment 38. The arrows 40 show the path of the circulating air.

Figure 2:
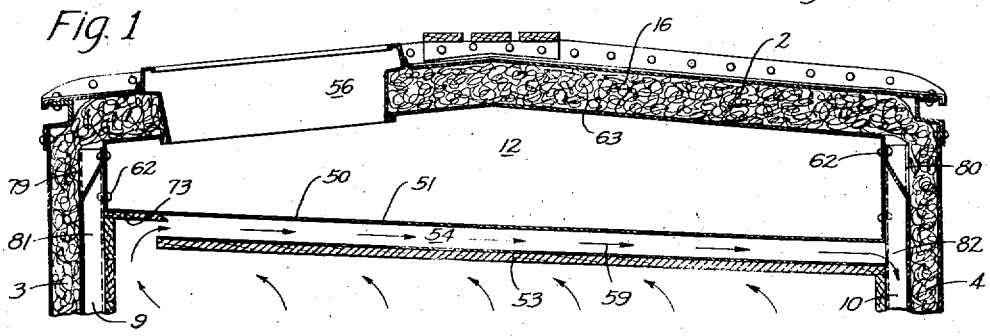
Fig. 2 is a fragmentary section similar to Fig. 1 but taken on a plane spaced from the plane of Fig. 1.

Fig. 2 as shown in the plan of Fig. 4, is on a plane parallel with and spaced from the plane of Fig. 1. The container 50 has a bottom 51 sloping downwardly toward the flue 10. The drip pan 53 likewise slopes downwardly toward the flue 10 and is spaced from the bottom 51 to provide the duct 54 which communicates with the flue 10. A hatch 56 is preferably provided on the opposite side of the car from the hatch 57 of Fig. 1. As shown in Fig. 4, the car is thus provided with containers 31 and hatches 57 alternating with containers 50 and hatches 56. The arrows 40 show the direction of air flow in the ducts 35 under the containers 31 while the arrows 59 show the direction of air flow in the ducts 54 under the containers 50.

The side wall is preferably supported by vertical frame members or posts 79, 80 disposed within the flues 9, 10 and positioned to divide said flues into a plurality of sections. The posts 79, 80 are positioned substantially as shown in Fig. 4 so that the flue 9 is divided into a plurality of sections 81 and the flue 10 is divided into a plurality of sections 82. It should be noted that air flowing under the containers 50 in the direction indicated by the arrows 59 flows, partly to one side and partly to the other side of the post 80, into the sections 82. Similarly, air flowing under the containers 31 in the direction indicated by the arrows 40 flows to the sections 81. Each side wall flue is thereby provided with a supply of cold air throughout substantially its entire length. If additional posts are required, they would be disposed between the posts 79, 80 and perforated so that air could permeate to all parts of the flues 9, 10.

The containers 31, 50 are preferably secured to the side walls 3, 4 as by the rivets 62. This arrangement permits the elimination of the conventional carlines and other roof frame members, the containers functioning as carlines. The tops 63 of the containers may function as retainers to hold the roof insulation 16 in place.

Figure 3:
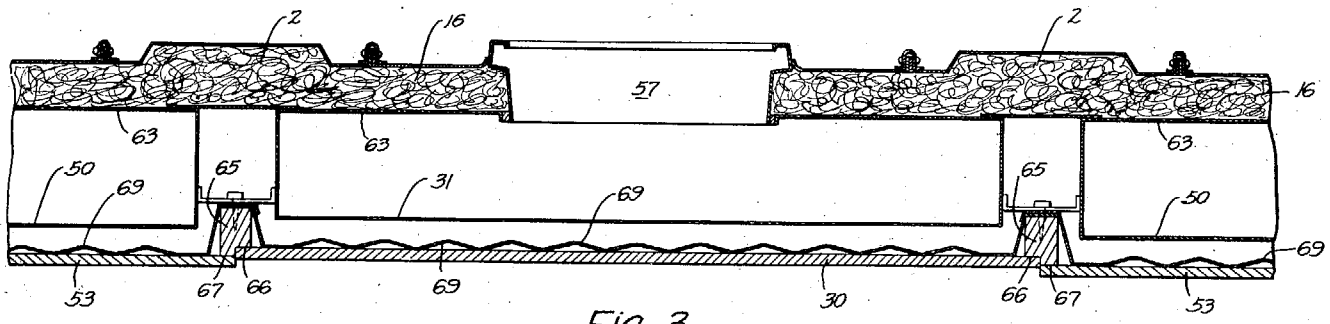
Fig. 3 is a longitudinal section on line 3—3 of Fig. 1.

Fig. 3 shows a longitudinal section through the hatch 57 and container 31 as shown in Fig. 1. Fig. 3 also shows the end portions of two containers 50 which are positioned on either side of the container 31 as shown in Fig. 4. The transverse members or separators 65 have oppositely inclined surfaces 66, 67 on the lower sides thereof. The surface 66 is inclined to conform to the slope of the drip pan 30 and the surface 67 is inclined to conform to the slope of the drip pan 53. The drip pans 30, 53 are rigidly secured to the members 65 to prevent flow of air therebetween into the chamber 12. Corrugated protecting pans 69 may be provided on the super surfaces of the drip pans 30, 53, the corrugations serving to keep condensation or melted refrigerant distributed thereover. The members 73 in Figs. 1 and 2 may be provided to prevent moisture from condensing on the containers and falling on the lading.

Figure 5:
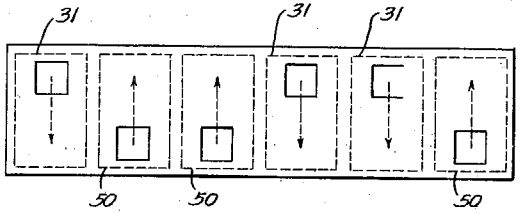
Figs. 5 to 7 are diagrammatic plan views showing modified constructions.

Fig. 5 shows a modification in which the similar containers 31 and 50 are arranged in pairs. It is not intended to limit the invention to similar containers arranged singly or in pairs but it is desired to include groups of three, four or even more containers from which air circulates to the same side of the car.

Figure 6:
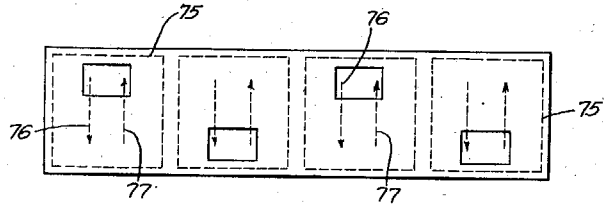

Fig. 6 shows diagrammatically an arrangement in which two drip pans are preferably spaced from the bottom of each container 75. One of such drip pans is inclined like the drip pan 30 in Fig. 1, thereby directing circulating air to the flue 9, as shown by arrows 76 in Fig. 6. The other of such drip pans is inclined like the drip pan 53 in Fig. 2, thereby directing circulating air to the flue 10, as shown by arrows 77 in Fig. 6.

Figure 7:
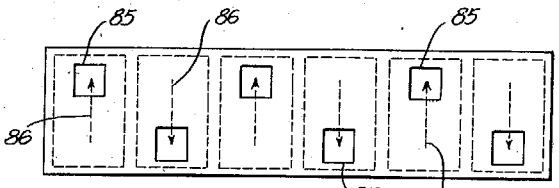

Fig. 7 shows a modification in which the hatches 85 are positioned adjacent the walls to which the air in the ducts under the containers flows. The arrows 86 show the direction of flow of said air.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a refrigerator having a roof and spaced apart side walls, a refrigerant container below said roof extending between said side walls and means to secure opposite walls of said container to said side walls, said container functioning as a carline for supporting at least part of said roof.

2. In a refrigerator having spaced apart walls, a roof extending therebetween, a foraminous rack arranged to support a lading upon the floor of the refrigerator and provide a space therebetween, flue means associated with each of said walls to conduct cold air to said space, a refrigerant chamber near the roof, refrigerating means within said chamber, warm air inlet means leading to said chamber, and means providing cold air discharge openings leading from said chamber to the flue means associated with both of said walls.

3. In a refrigerator having spaced apart walls, a roof extending therebetween, a foraminous rack arranged to support a lading upon the floor of the refrigerator and provide a space therebetween, flue means associated with each of said walls to conduct cold air to said space, a refrigerant chamber near the roof, refrigerating means within said chamber, warm air inlet means leading to said chamber, and means providing cold air discharge openings leading from said chamber to the flue means associated with one of said walls and other cold air discharge openings leading to the flue means associated with the other of said walls.

4. In a refrigerator having spaced apart walls, a roof extending therebetween, a foraminous rack arranged to support a lading upon the floor of the refrigerator and provide a space therebetween, flue means associated with each of said walls to conduct cold air to said space, a refrigerant chamber near the roof, refrigerating means within said chamber, warm air inlet means leading to said chamber, and means providing cold air discharge openings leading from said chamber to the flue means associated with one of said walls and other cold air discharge openings in staggered relation to said first mentioned discharge openings leading to the flue means associated with the other of said walls.

5. In a refrigerator having spaced apart walls, a roof extending therebetween, a foraminous rack arranged to support a lading upon the floor of the refrigerator and provide a space therebetween, flue means associated with each of said walls to conduct cold air to said space, a refrigerant chamber near the roof, refrigerating means within said chamber, warm air inlet ducts leading to said chamber, and means providing cold air discharge openings leading from said chamber to the flue means associated with one of said walls and other cold air discharge openings leading to the flue means associated with the other of said walls, said air inlet openings being disposed oppositely of the car from the respective discharge openings.

6. In a refrigerator car having spaced apart side walls and a roof extending therebetween, a foraminous rack arranged to support a lading upon the floor of the car and provide a space therebetween, flue means associated with each of said walls and arranged to conduct cold air to said space, a plurality of refrigerant containers below the roof arranged in a line longitudinally of the car, and a drip pan below each container in spaced relation thereto to provide a duct therebetween, the ducts below some of said containers communicating with the flue means associated with one of said walls and the others of said ducts communicating with the flue means associated with the other of said walls.

7. In a refrigerator car having spaced apart side walls and a roof extending therebetween, a foraminous rack arranged to support a lading upon the floor of the car and provide a space therebetween, flue means associated with each of said walls and arranged to conduct cold air to said space, a plurality of refrigerant containers below the roof arranged in a line longitudinally of the car, and a drip pan below each container in spaced relation thereto to provide a duct therebetween, the ducts below some of said containers communicating with the flue means associated with one of said walls and the other of said ducts communicating with the flue means associated with the other of said walls, said drip pans being inclined downwardly toward the flue means with which the respective ducts communicate.

8. In a refrigerator car having spaced apart walls and a roof, flue means associated with each of said walls and arranged to deliver air to the lower part of the interior of said car, a plurality of refrigerant containers near said roof, an air cooling duct adjacent each of said containers and extending substantially between said walls, air inlet openings leading to said ducts, an air discharge opening leading from one of said ducts to the flue means associated with one of said walls, and another discharge opening leading from another of said ducts to the flue means associated with the other of said walls.

9. In a refrigerator car having spaced apart walls and a roof, flue means associated with each of said walls and arranged to deliver air to the lower part of the interior of said car, a plurality of refrigerant containers near said roof, means cooperating with said roof and walls to enclose said containers, said last mentioned means arranged to form in combination with said containers air cooling ducts adjacent said containers and extending substantially between said walls, air inlet openings leading to said ducts, and air discharge openings leading from said ducts to said flue means.

10. In a refrigerator car having spaced apart walls and a roof, flue means associated with each of said walls and arranged to deliver air to the lower part of the interior of said car, a refrigerant container near said roof, means cooperating with said container to form an air cooling space adjacent said container and air inlet means leading to said space, and air discharge openings leading from said space to the flue means associated with both of said walls.

11. In a refrigerator car having a pair of spaced apart walls and a roof, a refrigerant container disposed below said roof and extending substantially between said walls, and a hatch in said roof adjacent one of said walls arranged for loading refrigerant therethrough into said container, the bottom of said container being inclined downwardly toward the other of said walls.

12. In a refrigerator car having a pair of spaced apart walls and a roof, a plurality of refrigerant containers disposed below said roof and extending substantially between said walls, and hatches in said roof disposed alternately adjacent each of said walls and arranged for loading refrigerant therethrough into said containers, the bottom of each of said containers being inclined downwardly away from the wall adjacent the respective hatch.

13. In a refrigerator car having a pair of spaced apart walls and a roof, a refrigerant container disposed below said roof and extending substantially between said walls, a hatch in said roof adjacent one of said walls arranged for loading refrigerant therethrough into said container, the bottom of said container being inclined downwardly toward the other of said walls, a flue associated with said last mentioned wall and arranged to conduct air to the lower part of the car, a drip pan spaced below said bottom to form an inclined duct therebetween which communicates at its lower end with the upper part of said flue, and an air inlet opening to the upper part of said duct.

14. In a refrigerator having spaced apart walls, roof and floor defining in part a lading compartment, a foraminous rack arranged to support a lading upon said floor and provide a space therebetween, flue means associated with each of said walls communicating with said space, a partition spaced below said roof and extending substantially between said walls, a plurality of longitudinally spaced transversely extending separators extending upwardly from said partition to provide a plurality of separated chambers extending substantially between said walls and communicating with both of said flues, refrigerating means in said chambers, the bottoms of some of said chambers declining toward one of said flues to direct air cooled by said refrigerating means thereinto and the bottoms of others of said chambers declining toward the other of said flues to direct air cooled by said refrigerating means thereinto, and warm air inlet openings adjacent said walls and the higher ends of said bottoms, whereby air cooled by said refrigerating means is directed by said declined bottoms into both of said flues from whence it flows through said space and lading compartment and returns to said chambers through said warm air intakes and repeats the cycle.

15. In a refrigerator having spaced apart walls, roof and floor defining in part a lading compartment, a foraminous rack arranged to support a lading upon said floor and provide a space therebetween, flue means associated with each of said walls communicating with said space, a partition spaced below said roof and extending substantially between said walls, a plurality of longitudinally spaced transversely extending separators extending upwardly from said partition to provide a plurality of separated chambers extending substantially between said walls, a container adapted to contain refrigerating means in each of each chambers, the bottoms of said containers and said partition being spaced, parallel and declined to form ducts, some of said ducts declining toward one of said flues to direct air cooled by said refrigerating means thereinto and others of said ducts declining toward the other of said flues to direct air cooled by said refrigerating means thereinto, and warm air inlet openings adjacent said walls and the higher ends of said ducts whereby air cooled by said refrigerating means is directed by said declined ducts into both of said flues from whence it flows through said space and lading compartment and returns to said ducts through said warm air intakes and repeats the cycle.

16. A structure as defined in claim 15 including hatches in said roof and containers above the higher ends of said ducts to facilitate speeding the refrigerant over the bottoms of the containers.

CHARLES D. BONSALL.